(12) United States Patent
Kumar et al.

(10) Patent No.: US 11,452,984 B2
(45) Date of Patent: Sep. 27, 2022

(54) ADSORBENT COMPOSITION AND A PROCESS FOR PREPARING THE SAME

(71) Applicant: RELIANCE INDUSTRIES LIMITED, Maharashtra (IN)

(72) Inventors: Satish Kumar, Gurgaon (IN); Sunil Peter, Kannur District (IN); Sunil Agrahari, Siddharth Nagar (IN); Kalpana Gopalakrishnan, Vadodara (IN); Dinesh Kakkar, Firozpur (IN); Prakash Kumar, Vadodara (IN); Raksh Vir Jasra, Vadodara (IN)

(73) Assignee: RELIANCE INDUSTRIES LIMITED, Maharashtra (IN)

( * ) Notice: Subject to any disclaimer, the term of this patent is extended or adjusted under 35 U.S.C. 154(b) by 401 days.

(21) Appl. No.: 16/618,744

(22) PCT Filed: May 18, 2018

(86) PCT No.: PCT/IB2018/053518
§ 371 (c)(1),
(2) Date: Dec. 2, 2019

(87) PCT Pub. No.: WO2018/211469
PCT Pub. Date: Nov. 22, 2018

(65) Prior Publication Data
US 2020/0164340 A1 May 28, 2020

(30) Foreign Application Priority Data

May 19, 2017 (IN) .............................. 201721017607

(51) Int. Cl.
*B01J 20/04* (2006.01)
*B01J 20/08* (2006.01)
*B01J 20/28* (2006.01)
*B01J 20/30* (2006.01)

(52) U.S. Cl.
CPC ............. *B01J 20/041* (2013.01); *B01J 20/08* (2013.01); *B01J 20/28004* (2013.01); *B01J 20/2808* (2013.01); *B01J 20/28011* (2013.01); *B01J 20/28061* (2013.01); *B01J 20/28071* (2013.01); *B01J 20/28073* (2013.01); *B01J 20/3007* (2013.01); *B01J 20/3021* (2013.01); *B01J 20/3028* (2013.01); *B01J 2220/42* (2013.01)

(58) Field of Classification Search
CPC . B01J 20/04; B01J 20/041; B01J 20/08; B01J 20/28004; B01J 20/28011; B01J 20/28061; B01J 20/28071; B01J 20/28073; B01J 20/2808; B01J 20/3007; B01J 20/3021; B01J 20/3028; B01J 2220/42
USPC ......................................................... 502/415
See application file for complete search history.

(56) References Cited

U.S. PATENT DOCUMENTS

2002/0043501 A1  4/2002  Irvine

OTHER PUBLICATIONS

Tran, Khai, Patching Java Executables—The Easy Way, NetSPI Blog, May 16, 2013, 5 pages.

*Primary Examiner* — Edward M Johnson
(74) *Attorney, Agent, or Firm* — Fish IP Law, LLP

(57) ABSTRACT

An adsorbent composition for reducing impurities of heat transfer fluids is provided and a process for the preparation of the same. The adsorbent composition comprises a layered double hydroxide in an amount in the range of 15 to 70 wt % of the total mass of the composition; alumina in an amount in the range of 30 to 85 wt % of the total mass of the composition; and optionally activated bauxite in an amount in the range of 15 to 50 wt % of the total mass of the composition. The adsorbent composition is economical and eco-friendly, having feed processing capacity in the range of 58 to 600 gm/gm.

14 Claims, No Drawings

ADSORBENT COMPOSITION AND A PROCESS FOR PREPARING THE SAME

FIELD

The present disclosure relates to an adsorbent composition and a process for preparing the same.

Definitions

As used in the present disclosure, the following terms are generally intended to have the meaning as set forth below, except to the extent that the context in which they are used to indicate otherwise.

Total acid number (TAN) refers to a measurement of acidity which is determined by the amount of potassium hydroxide in milligrams that is needed to neutralize the acids in one gram of oil.

Chemisorption refers to adsorption method wherein the adsorbed material(s) is/are held by chemical bonds.

Extruding Aide refers to an additive which reduces or eliminates surface defects that appear during extrusion process.

BACKGROUND

Heat transfer fluids are used for a wide range of indirect heat transfer applications. However, as a result of failure of process equipment during working of a process, contaminants such as acidic contaminants from the process equipment can be transferred or introduced in heat transfer fluids, which leads to the reduced efficiency of heat transfer fluids.

Conventionally, the acidic contaminants can be removed from heat transfer fluid by distillation. However, acidic contaminants having similar boiling points cannot be removed by distillation. Further, acidic contaminants present in heat transfer fluid can be removed using alkali wash. However, in this process, removal of traces of moisture from heat transfer fluid is tedious and a substantial amount of heat transfer fluid is lost.

There is, therefore, felt a need for an alternative to reduce total acid number (TAN) of the heat transfer fluid that overcomes the above mentioned drawbacks.

OBJECTS

Some of the objects of the present disclosure, which at least one embodiment herein satisfies, are as follows.

It is an object of the present disclosure to ameliorate one or more problems of the prior art or to at least provide a useful alternative.

An object of the present disclosure is to provide an adsorbent composition to reduce the total acid number (TAN) of heat transfer fluid.

Another object of the present disclosure is to provide a process for preparation of the adsorbent composition.

Still another object of the present disclosure is to provide an eco-friendly and an economical adsorbent composition to reduce the total acid number (TAN) of the heat transfer fluid.

Other objects and advantages of the present disclosure will be more apparent from the following description, which is not intended to limit the scope of the present disclosure.

SUMMARY

The present disclosure provides an adsorbent composition used for reducing impurities of the heat transfer fluid. The adsorbent composition comprises a layered double hydroxide in an amount in the range of 15 to 70 wt % of the total mass of the composition; alumina in an amount in the range of 30 to 85 wt % of the total mass of the composition; and optionally activated bauxite in an amount in the range of 15 to 50 wt % of the total mass of the composition.

The adsorbent composition of the present disclosure is characterized by particle size in the range of 1 mm to 10 mm; bulk density in the range of 600 to 800 Kg/m$^3$; pore diameter in the range of 70 Å to 110 Å; pore volume in the range of 0.19 to 0.54 cc/g; surface area in the range of 200 m$^2$/g to 250 m$^2$/g; and crushing strength in the range of 1.5 Kg/f to 2.5 Kg/f. The adsorption capacity of the adsorbent composition is in the range of 58 to 60 gm/gm.

The present disclosure further provides a process for preparation of the adsorbent composition. The process comprises mixing a layered double hydroxide with alumina to obtain a mixture, followed by grinding under inert atmosphere to particle size in the range of 30 to 40 microns to obtain a blend comprising the double hydroxide and alumina. The blend is agglomerated in a fluid medium comprising a pre-determined amount of water and at least one extruding aide, followed by extrusion of the agglomerate to form shaped articles. The shaped articles are dried at a temperature in the range of 100° C. to 200° C. for a time period in the range of 1 hour to 3 hours, followed by calcining at a temperature in the range of 400° C. to 600° C. for a time period in the range of 3 hours to 6 hours to obtain the adsorbent composition.

DETAILED DESCRIPTION

Heat transfer fluids are used for multifarious heat transfer applications. However, during working of the process, chemicals from the process equipment can be introduced in the high temperature operating heat transfer fluid. The conventional methods for removal of the contaminants from the heat transfer fluid are associated with drawbacks such as expense, loss of the fluids and formation of hazardous waste.

The present disclosure, therefore, envisages an adsorbent composition for reducing impurities of heat transfer fluid and process for the preparation of the same.

In one aspect, the present disclosure discloses an adsorbent composition for treatment of heat transfer fluids. The composition comprises a layered double hydroxide in an amount in the range of 15 to 70 wt % of the total mass of the composition; alumina in an amount in the range of 30 to 85 wt % of the total mass of the composition; and optionally, activated bauxite in an amount in the range of 15 to 50 wt % of the total mass of the composition.

The adsorbent composition of the present disclosure is characterized by particle size in the range of 1 mm to 10 mm; bulk density in the range of 600 to 800 Kg/m$^3$; pore diameter in the range of 70 Å to 110 Å; pore volume in the range of 0.19 to 0.54 cc/g; surface area in the range of 200 m$^2$/g to 250 m$^2$/g; and crushing strength in the range of 1.5 Kg/f to 2.5 Kg/f. The adsorption capacity of the adsorbent composition is in the range of 58 to 60 gm/gm.

In accordance with one embodiment of the present disclosure, the composition comprises 20 wt % of a layered double hydroxide and 80 wt % of alumina, and the composition is characterized by particle of 1.5 mm; bulk density of 600 Kg/m$^3$; pore diameter of 101 Å; pore volume of 0.54 cc/g; surface area of 214 m$^2$/g; and crushing strength of 1.5 Kg/f.

In accordance with another embodiment of the present disclosure, the composition comprises 10 wt % of a layered double hydroxide; 60 wt % of alumina; and 30 wt % of activated bauxite, and the composition is characterized by particle size of 1.5 mm; bulk density of 800 Kg/m$^3$; pore diameter of 80 Å; pore volume of 0.19 cc/g; surface area of 200 m$^2$/g; and crushing strength of 2.0 Kg/f.

Typically, the layered double hydroxide is hydrotalcite having magnesium oxide (MgO) to aluminium oxide ($Al_2O_3$) ratio in the range of 4 to 5 and surface area in the range of 5 to 15 m$^2$/g.

Typically, alumina is at least one selected from gamma alumina and pseudoboehmite. In accordance with the exemplary embodiment of the present disclosure, alumina is gamma alumina.

The adsorbent composition optionally comprises activated bauxite. The present disclosure suggests activation of the bauxite before incorporating it to adsorbent composition. Bauxite present in natural form is alkaline in nature and contains humic organic materials and is not effective in removing the acidic contaminants from the heat transfer fluids. Therefore, bauxite is activated by crushing and heating at a temperature in the range of 400° C. to 650° C. in the presence of air so as to burn the organic materials contained in the bauxite. The step of crushing and heating increases the porosity and surface area of bauxite. Activated bauxite thus prepared is effective in removing the acidic contaminants from heat transfer fluid.

In another aspect, the present disclosure provides a process for preparing the adsorbent composition for reducing impurities of heat transfer fluid. The process is given in detail below.

Initially, a layered double hydroxide is mixed with alumina to obtain a mixture. The mixture is grinded under inert atmosphere to a particle size in the range of 30 to 40 microns to obtain a blend comprising the double hydroxide and alumina.

In accordance with one embodiment of the present disclosure, a layered double hydroxide is mixed with alumina and activated bauxite.

The so obtained blend is agglomerated in a fluid medium comprising a pre-determined amount of water and at least one extruding aide, followed by extrusion of the agglomerate to form shaped articles. In accordance with the process of the present disclosure, the step of agglomeration comprises pugging and kneading the blend.

Typically, the pre-determined amount of water in the fluid medium is in the range of 70 to 80 wt % and the pre-determined amount of the extruding aide is in the range of 20 to 30 wt %.

Typically, the extruding aide is at least one selected from the group consisting of acetic acid, nitric acid, ortho-phosphoric acid, and lubolic acid.

Further, the shaped articles are dried at a temperature in the range of 100° C. to 200° C. for a time period in the range of 1 hour to 3 hours, followed by calcining at a temperature in the range of 400° C. to 600° C. for a time period in the range of 3 hours to 6 hours to obtain the adsorbent composition.

The acidic contaminants in heat transfer fluids increase the acidity i.e. the total acid number of heat transfer fluids, which in turn reduces the pH (pH below 4). Due to the acidic nature of heat transfer fluids, the equipment where heat transfer fluids are used faces high risk of corrosion. Acidic contaminants present in heat transfer fluids are removed, on contacting heat transfer fluids with the adsorbent composition at a temperature in the range of 50 to 350° C., thereby increasing the pH of heat transfer fluids in the range of 6.5 to 7.5, i.e. reducing the total acid number of the heat transfer fluid(s). Typically, the adsorbent composition removes the acidic contaminants by chemisorption.

In accordance with the process of the present disclosure, the adsorbent composition is introduced in the heat transfer fluid without interrupting or discontinuing the continuous process.

The present disclosure provides economical adsorbent composition capable of removing more than 90% of the acidic contaminants from the contaminated heat transfer fluid. The adsorbent composition of the present disclosure removes the acidic contaminants by chemisorption, thereby avoiding formation of hazardous waste. The adsorbent composition of the present disclosure can be recycled, thereby making the process economical in the long run.

The present disclosure is further illustrated herein below with the help of the following laboratory experiments. The experiments used herein are intended merely to facilitate an understanding of the ways in which the embodiments herein may be practiced and to further enable persons skilled in the art to practice the embodiments. Accordingly, the experiments should not be construed as limiting the scope of the embodiments herein. These experiments can be scaled up to a commercial scale.

EXPERIMENTAL DETAILS

Experiment 1: Preparing the Adsorbent Composition in Accordance with the Present Disclosure 20 g (on dry weight basis) Hydrotalcite powder was mixed with 80 g (on dry weight basis) gamma alumina powder to produce a mixture and grinded in a ball mill to the size of 35 microns. The mixture was pugged and kneaded using a solution comprising water (70 wt %), acetic acid (20 wt %), and lubolic acid (10 wt %) to produce dough. The dough was then introduced into an extruder to form extrudates, wherein the size of each extrudate was 3 mm. The extrudates were air dried at 100° C. followed by calcining the dried extrudates at 550° C. for 5 hours to obtain the adsorbent composition.

Experiment 2: Preparing the Adsorbent Composition in Accordance with the Present Disclosure 10 g (on dry weight basis) Hydrotalcite was mixed with 60 g (on dry weight basis) gamma alumina and 30 g (on dry weight basis) activated bauxite, to produce a mixture and grinded in a ball mill to the size of 35 microns. The mixture was pugged and kneaded using a solution comprising water (70 wt %), acetic acid (20 wt %), and lubolic acid (10 wt %) to produce dough. The dough was then introduced into an extruder to form extrudates, wherein the size of each extrudate was 3 mm. The extrudates were air dried at 100° C. followed by calcining the dried extrudates at 550° C. for 5 hours to obtain the adsorbent composition.

Trial 1: Treatment of the Heat Transfer Fluid Using Adsorbent Composition of Experiment 1 of the Present Disclosure A contaminated heat transfer fluid (10.2 kg) having a pH value of 3.9, total acid number of 0.12 and moisture content of 500 ppm was passed through a fixed bed of 0.017 kg of adsorbent composition obtained in Experiment 1 at 250° C., liquid hourly space velocity (LHSV) of 5 h$^{-1}$, and a pressure of 1 bar. After the treatment, the heat transfer fluid with pH 7, total acid number (TAN) of 0.01, and 200 ppm moisture was obtained.

Different physicochemical properties of the treated heat transfer fluid are tabulated in Table-1 given below.

Trial 2: Treatment of the Heat Transfer Fluid Using Adsorbent Composition of Experiment 2 of the Present Disclosure A contaminated heat transfer fluid (5 kg) having a pH value of 3.9, total acid number of 0.12 and moisture content of 500 ppm was passed through a fixed bed of 0.042 kg of adsorbent composition obtained in Experiment 2 at 150° C., liquid hourly space velocity (LHSV) of 5 $h^{-1}$, and a pressure of 1 bar. After the treatment, the heat transfer fluid with pH 7, total acid number (TAN) of 0.01, and 300 ppm moisture was obtained.

Different physicochemical properties of the treated heat transfer fluid are tabulated in Table-1 given below.

TABLE 1

| Properties | Pure heat transfer fluid (Dowtherm A) (Normal values) | Impure heat transfer fluid (Dowtherm A) | Heat transfer fluid (Dowtherm A) treated with the Adsorbent composition of Experiment 1 | Heat transfer fluid (Dowtherm A) treated with the Adsorbent composition of Experiment 2 |
|---|---|---|---|---|
| Kinematic Viscosity at 100° F. (cSt) | 2.5-3.4 | 2.52 | 2.5 | 2.6 |
| Total Acid Number, (mg KOH/g) | 0.0-0.03 | 0.12 | 0.01 | 0.01 |
| Moisture, ppm | 0-360 | 500 | 200 | 300 |
| Acetone Insoluble Solids, (mg/100 g) | 0-50 | 5.60 | 1.2 | 1.2 |
| Low Boilers (%) | 0 | 0.05 | 0 | ND |
| High Boilers plus Unaccountable (%) | 0 | 0.45 | 0.05 | 0.06 |

From Table-1, it is observed that compared to the impure heat transfer fluid, the physicochemical properties of the treated heat transfer fluid are improved.

TECHNICAL ADVANCEMENTS

The present disclosure described herein above has several technical advantages including, but not limited to, an adsorbent composition and a process for preparing the same that:

is economical; and is environment friendly.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. An adsorbent composition for reducing impurities of heat transfer fluids, comprising:
   a. a layered double hydroxide in an amount in the range of 15 to 70 wt % of the total mass of the composition;
   b. an alumina in an amount in the range of 30 to 85 wt % of the total mass of the composition;
   c. optionally, activated bauxite in an amount in the range of 15 to 50 wt % of the total mass of the composition; and wherein the layered double hydroxide is hydrotalcite having magnesium oxide (MgO) to aluminum oxide ($Al_2O_3$) ration in the range of 4 to 5 and surface area in the range of 5 to 15 $m^2/g$.

2. The composition as claimed in claim 1 comprises:
   a. 20 wt % of a layered double hydroxide; and
   b. 80 wt % of alumina.

3. The composition as claimed in claim 1 comprises:
   a. 10 wt % of a layered double hydroxide;
   b. 60 wt % of alumina; and
   c. 30 wt % of activated bauxite.

4. The composition as claimed in claim 1 is characterized by particle size in the range of 1 mm to 10 mm; bulk density in the range of 600 to 800 $Kg/m^3$; pore diameter in the range of 70 Å to 110 Å; pore volume in the range of 0.19 to 0.54 cc/g; surface area in the range of 200 $m^2/g$ to 250 $m^2/g$; and crushing strength in the range of 1.5 Kg/f to 2.5 Kg/f.

5. The composition as claimed in claim 1, wherein the feed processing capacity of the adsorbent composition is in the range of 58 to 600 gm/gm.

6. The composition as claimed in claim 1, wherein the alumina is at least one selected from the group consisting of gamma alumina and pseudoboehmite.

7. The composition as claimed in claim 1, wherein alumina is gamma alumina.

8. A process for preparing the adsorbent composition for reducing impurities of heat transfer fluids as claimed in claim 1, the process comprising:
   i. mixing a layered double hydroxide with alumina to obtain a mixture; followed by grinding the mixture under inert atmosphere to a particle size in the range of 30 to 40 microns to obtain a blend comprising the double hydroxide and alumina;
   ii. agglomerating the blend in a fluid medium comprising a pre-determined amount of water and at least one extruding aide, followed by extrusion of the agglomerate to form shaped articles;
   iii. drying the shaped articles under inert atmosphere at a temperature in the range of 100° C. to 200° C. for a time period in the range of 1 hour to 3 hours, followed by calcining at a temperature in the range of 400° C. to 600° C. for a time period in the range of 3 hours to 6 hours to obtain the adsorbent composition.

9. The process as claimed in claim 8, wherein the mass ratio of layered double hydroxide to alumina is in the range of 1:2 to 1:8.

10. The process as claimed in claim 8, wherein the mixture obtained in step (i) comprises activated bauxite.

11. The process as claimed in claim 8, wherein the pre-determined amount of water in the fluid medium is in the range of 70 to 80 wt %.

12. The process as claimed in claim 8, wherein the pre-determined amount of extruding aide in the fluid medium is in the range of 20 to 30 wt %.

13. The process as claimed in claim 8, wherein the extruding aide is at least one selected from the group consisting of acetic acid, nitric acid, ortho-phosphoric acid, and lubolic acid.

14. The process as claimed in claim 10, wherein activated bauxite is prepared by crushing and heating bauxite at a temperature in the range of 400° C. to 650° C. in the presence of air.

\* \* \* \* \*

UNITED STATES PATENT AND TRADEMARK OFFICE
CERTIFICATE OF CORRECTION

| | |
|---|---|
| PATENT NO. | : 11,452,984 B2 |
| APPLICATION NO. | : 16/618744 |
| DATED | : September 27, 2022 |
| INVENTOR(S) | : Satish Kumar et al. |

It is certified that error appears in the above-identified patent and that said Letters Patent is hereby corrected as shown below:

In the Claims

At Column 6, Lines 49 and 50, change, "ration in the range of 4 to 5" to --ratio in the range of 4 to 5--

At Column 7, Lines 4 and 5, change, "wherein alumina is gamma alumina" to --wherein the alumina is gamma alumina--

Signed and Sealed this
Tenth Day of January, 2023

Katherine Kelly Vidal
*Director of the United States Patent and Trademark Office*